United States Patent [19]

Licciardi

[11] 4,206,997
[45] Jun. 10, 1980

[54] METHOD AND DEVICE FOR MAKING COMBINED IMAGES FOR PHOTOGRAPHY

[76] Inventor: Robert P. Licciardi, P.O. Box 223, Shinjuku, Tokyo 160-91, Japan

[21] Appl. No.: 870,415

[22] Filed: Jan. 18, 1978

[30] Foreign Application Priority Data

Jan. 18, 1977 [JP] Japan .................................. 52-4350

[51] Int. Cl.² ...................... G03B 17/24; G03B 27/32
[52] U.S. Cl. ...................................... 355/39; 354/109
[58] Field of Search ............................ 354/290–292, 354/295, 296, 105, 109, 122, 354; 355/39, 45, 46, 40, 20, 71, 77

[56] References Cited

U.S. PATENT DOCUMENTS

| | | | |
|---|---|---|---|
| 2,316,694 | 4/1943 | Jarboe | 354/122 |
| 2,602,369 | 7/1952 | Tuttle | 355/39 |
| 2,641,952 | 6/1953 | Mellert | 354/296 X |
| 2,821,105 | 1/1958 | Walker | 354/296 X |
| 3,017,235 | 1/1962 | Sigmond | 354/109 X |
| 3,111,887 | 11/1963 | Alexander | 354/105 |
| 3,323,413 | 6/1967 | Ritchie | 355/39 |
| 3,791,733 | 2/1974 | Horvath et al. | 355/39 |
| 3,940,775 | 2/1976 | Bodnar | 354/122 |
| 4,053,220 | 10/1977 | Mathison | 355/45 |
| 4,056,316 | 11/1977 | Zutrauen | 355/77 X |

*Primary Examiner*—Donald A. Griffin
*Attorney, Agent, or Firm*—Armstrong, Nikaido, Marmelstein & Kubovcik

[57] ABSTRACT

An image combining apparatus for use in photography. The apparatus is in the form of a rectangular box having three open vertical side walls. A removable one-way mirror is diagonally positioned within the box. The reflective surface of the mirror faces two of the open vertical side walls. The open side wall not facing the reflective mirror surface is adapted to removably mount a titler apparatus. The open side wall lying in a plane parallel to the side mounting the titler apparatus is adapted to mount a camera. The third open side wall includes two pairs of aligned upper and lower guide rails. The first pair of guide rails are adapted to receive interchangeable image forming slides. The second pair of guide rails are adapted to receive a removable light source. A horizontal bottom wall includes a diagonally extending mirror guide rail for holding the removable one-way mirror in a predetermined exact position. In operation, images from both the titler and the image forming slides are simultaneously projected into the camera body.

1 Claim, 6 Drawing Figures

METHOD AND DEVICE FOR MAKING COMBINED IMAGES FOR PHOTOGRAPHY

SUMMARY OF THE INVENTION

An object of the present invention is to provide an improved image combining apparatus for use in photography.

Another object of the invention is to provide an apparatus capable of superimposing an illuminated title over another image such as scenery without the necessity of taking a double exposure.

Still another object of the invention is to provide a pair of aligned grooves for removably and interchangeably mounting various image forming members.

A further object of the invention is to provide a pair of aligned grooves for removably mounting a light source.

The present invention is directed to an improved image combining apparatus for use in photography. The apparatus is in the form of a rectangular box having three open vertical side walls. A removable one-way mirror is diagonally positioned within the box. The reflective surface of the mirror faces two of the open vertical side walls. The open side wall not facing the reflective mirror surface is adapted to mount a titler apparatus. The open side wall lying in a plane parallel to the side mounting the titler apparatus is adapted to mount a camera. The third open side wall includes two pairs of aligned upper and lower guide rails. The first pair of guide rails are adapted to receive interchangeable image forming slides. The second pair of guide rails are adapted to receive a removable light source. A horizontal bottom wall includes a diagonally extending mirror guide rail for holding the removable one-way mirror in a predetermined exact position. In operation, images from both the titler and image forming slides are simultaneously projected into the camera body.

DETAILED DESCRIPTION OF THE INVENTION:

This invention relates to methods and devices for making combined images for photography which are useful for superimposing an image over another, for example, superimposing a title over another image such as scenery or living subjects such as human figures and plants.

The present inventor already proposed a titler in U.S. Pat. No. 3,802,102, which facilitates to produce cine titles. The device for making combined images for photography of the present invention is suitable as an attachment which can be associated with the titler to superimpose an illuminated title over another image such as scenery, living subjects and desired patterns without the necessity for making in camera double exposures. Besides, this device also finds, in association with a camera, an application as a composite picture-producing unit where a combined image is produced for two or more images.

Some of the photographic image superimposing devices are available in the market, but are very complicate in structure and expensive. Further, the technical knowledge required for using such devices is far beyond the level of amateur photographers. In contrast, the device of the present invention is simple in structure and cheap and can easily be handled by amateur photographers. The device of the present invention is useful particularly for persons handling still or movie cameras without double exposure facilities.

Figure 2:
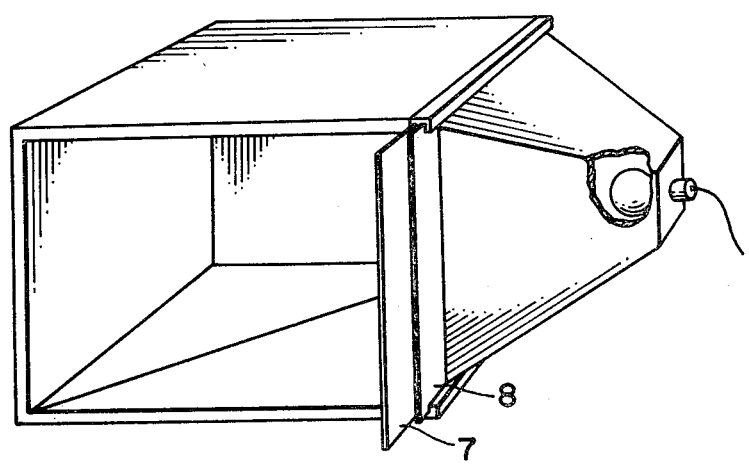
Figure 3:
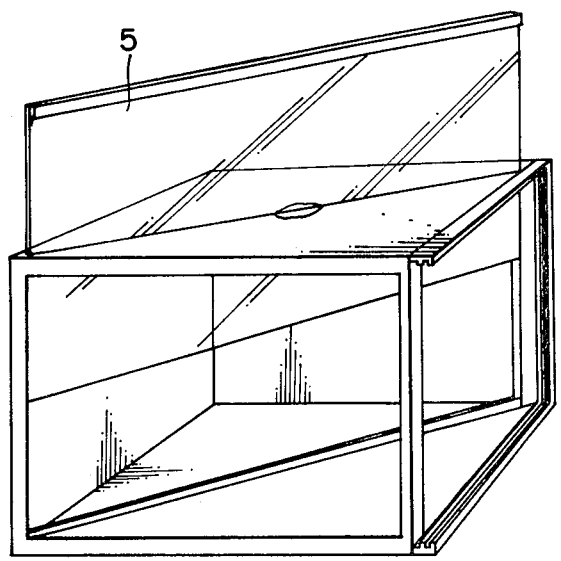
Figure 4:
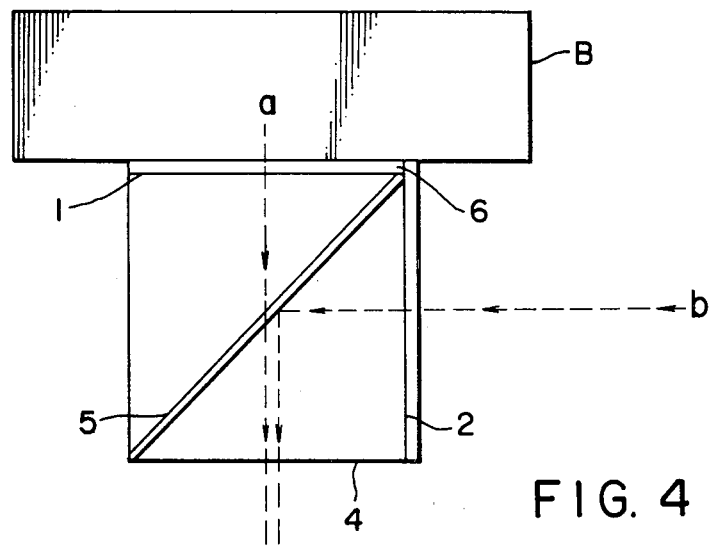
Figure 5:
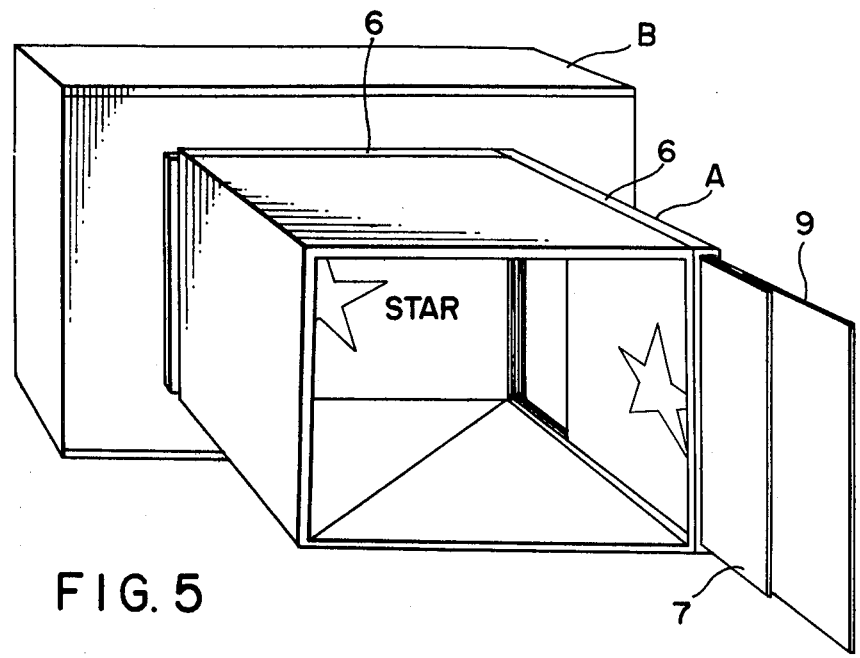
Figure 6:
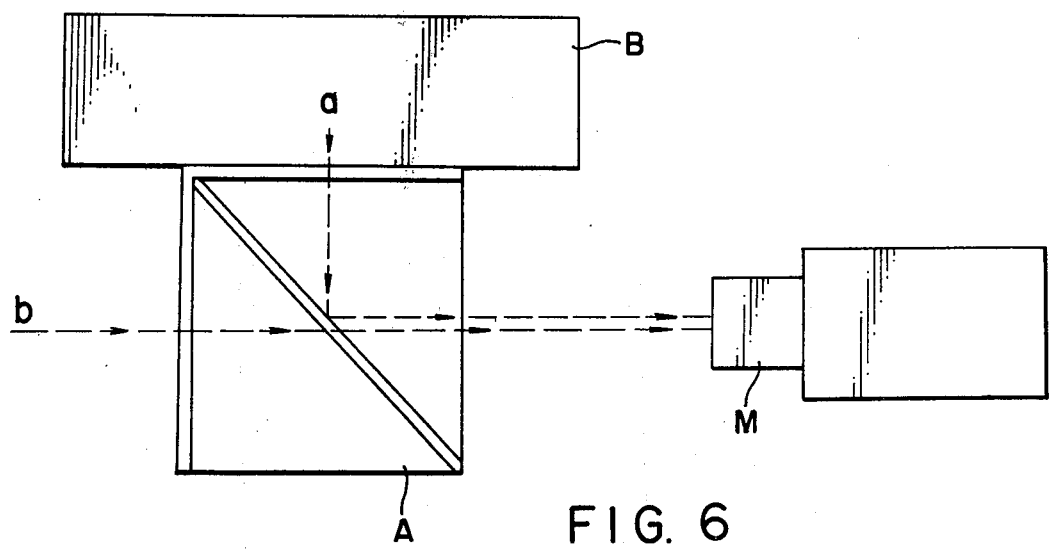

The structure of the device of this invention will now be explained with reference to the accompanying drawings in which FIGS. 1 to 3 and 5 are perspective views showing examples of the apparatus of the present invention and FIGS. 4 and 6 are a schematic view showing the principle of the formation of multiple images.

Figure 1:
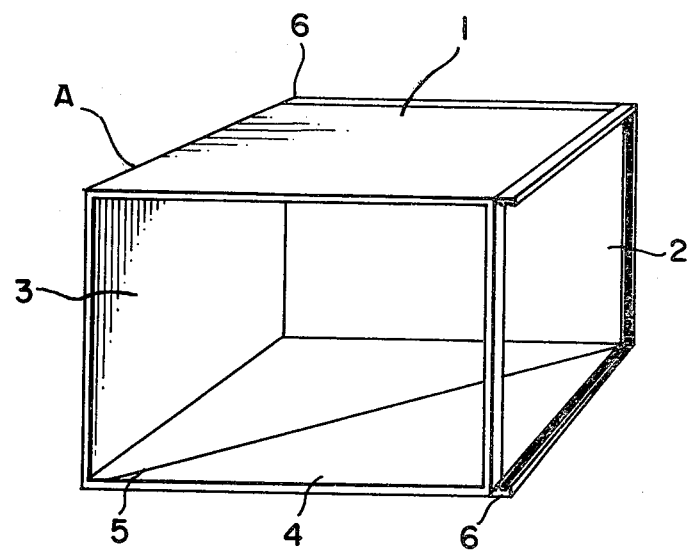

Referring to FIG. 1, a housing A in the form of a rectangular parallelepiped is provided with a first window 1, a second window 2, a third window 3 and camera window 4. At least the first window, the second window and the camera window may be open or formed with a transparent material such as glass so as to permit transmission of light therethrough, while the third window may be made of a non-transparent material since it is normally never used. The top and bottom walls of the housing are normally non-transparent or may be open if necessary. The top and bottom walls of the housing are normally formed of an opaque material or may be open, if necessary. The housing A may wholly be in the form a kit capable of being assembled at need. Disposed diagonally in the housing 1 is a beam splitter 5 such as a magic mirror. This beam splitter may be a prism, a light transmissible sheet such as a glass sheet or the like, besides the magic mirror, and can reflect a part of the light entering through a plane and allow transmission of the remaining light. A support member 6 is fitted to the periphery of the window to support a beam characteristics modifying means. According to such device, separate beams can easily be combined. As shown in FIG. 4, a beam a of an illuminated title in a titler 6 from a first window 1 and a beam b from a second window 2 are introduced into the housing provided with a beam splitter 5 along a diagonal plane thereof whereby a beam passing through a camera window to a camera M is a combined beam of a beam b reflected on the beam slitter 5 and a beam a straightly passing through the beam slitter 5. A combined (superimposed) image of an image bearing the beam a and an image bearing the beam b can be photographed by one exposure when the camera M is placed in the path of a combined beam of the beam a and the beam b In the present invention, a variety of the beam characteristics modifying means showing such modifying functions are involved in those supported by the support member 6. Examples of such means include masks, filters, transparent patterns or designs, screens, light intensity control means and focal distance compensating lenses, which may be used solely or in combination. The light intensity control means in this case includes various kinds of diaphragms, polarizing filters, composite polarizing filters (adapted to make light darker or brighter by rotation of one filter), a series of filters different in transparency, and light sources whose light intensity can be controlled by adjustment of the applied voltage. It is desirable that these beam characteristics modifying means are made in the same size so that they can be attached to the support member interchangeably among them.

FIG. 2 illustrates an example of the device in which a light source is provided to adjust the light intensity. In this figure, the numeral 7 indicates an image-forming member such as a filter, a mask and a patterned film for providing an image (or color) to be combined, and the numeral 8 a light source unit for reflecting the image with a proper brightness off the beam splitter 5 (such as a half mirror), which may be formed by fixing the open end of a housing having a built-in light source to a transparent plate to be supported by the support member. FIG. 3 shows an example of the structure in which the beam splitter 5 is made interchangeable.

The method of using the device of the present invention will now be described in detail. FIG. 5 is a schematic view showing the use of the device A of this invention associated with a titler B (U.S. Pat. No. 3,802,102 referred to). The titler B has such a structure that a built-in light source illuminates a desired transparent title ("STAR") in the central part thereof. The illuminated central part of the titler B is connected through the support member 6 provided at the periphery of the second window 2 to the device A of the present invention whereby the illuminated title can be viewed through the camera window 4. In case the device A of the present invention coupled in such manner with the titler B, the beam of the illuminated title passes through the first window 1 in the rear thereof and then straightly through the beam splitter 5 and at last through the camera window 4 to the camera M. On the other hand, a second image to be combined, for example, a mask 7 having thereon a transparent star-shaped image as shown in the figure is supported by a support member of the second window 2 located on the right side at an angle of 90° to the beam path of the titler B whereby the beam of the star-shaped image passes through the second window 2 and reflects on the beam splitter 5 and then through the camera window, together with the beam of the illuminated title from the titler, to the camera M where a combined image of the illuminated title and the star-shaped image are photographed. In case another image such as outdoor scenery in place of the mask 7 is reflected on the beam splitter 5 through the second window 2, the scenery can be combined with the illuminated title. Living subjects can also be superimposed over the illuminated title by reflecting them similarly. Anyway, various images including transparent films, scenery and living subjects as well as colors for the background and can be selected as an image or color to be superimposed over the illuminated title. It is desirable on actual use to provide one or more grooves around one or more of the windows 1-4 so that masks or filters may interchangeably be supported thereby. Other suitable support means may be used in place of the grooves.

It is apparent that the production of a combined title image which was difficult by the prior art can be done very easily by taking the structure and principle of the device of the present invention into consideration. For example, when a color filter is supported by the groove 6 of the window 2 and natural or artificial light is transmitted therethrough, an illuminated title can be superimposed over a colored background corresponding to the color filter. When a transparent pattern such as a mask having a star-shaped pattern is placed in front of the color filter, it is possible to produce a combined image having the illuminated title "STAR" and the star-shaped pattern of the color corresponding to the color filter, as shown in FIG. 5. Furthermore, when a screen made of frosted glass or translucent plastic is supported around the window 2 and an image is projected externally onto the screen by means of a slide or movie projector, the projected image can be superimposed over the illuminated title. In this case, the use of a mask exposing a desired portion, for example, a circular or heart-shaped portion of the screen but overlying the other portion permits superimposition of the image projected on the desired part alone of the screen over the illuminated title.

When the operation is conducted as described above, it is required in some cases to control the light entering through the first window or the second window. This control can be made by placing a dark filter a composite polarizing filter or the like. When an artificial light is used as shown in FIG. 2, the light control can be attained by adjusting the voltage applied to the lamp. Where an iris is used, the light control can be made by opening and closing the iris. An image with a desired contrast (intensity) can be superimposed over the title image by controlling the intensity of light entering through the first window or the second window in such manner.

Another preferable beam characteristics modifying means to be attached to the device of the present invention is a lens for compensating the differences in focal distances of the subjects to be combined and photographed. For example, where the primary subject is located in the window plane inserted into the grooves of the first window and the secondary subject is located in a place far distance from the second window, one of the subjects will be out focus when the camera is focused on either one of the subjects. Such inconvenience can be removed by placing a lens for compensating for differences in focal distances of the subjects in one of the window planes.

In case the device of the present invention is used in such a construction as shown in FIG. 4, the secondary image will be reflected on the beam splitter and thus will be reversed when viewed or photographed through the camera window. In the case of using a rear projection screen, this reversion of the image is advantageous When really existing matters, such as scenery and human figures viewed through the second window are combined, however, such reversion of the image is undesirable, as the reversed image looks unnatural. This undesired problem can be solved by coupling the titler B with the device A in such manner that the window 1 and the window 2 are reversed as shown in FIG. 6 whereby the beam entering through the window 1 passes straightly but the beam of the illuminated title entering from the titler B is reflected, and then photographing these beams. In this case, the letters should previously be illuminated in reversed state on the titler plane, otherwise the illuminated title from the titler B would be photographed in reversed state by the camera M.

As is evident from the principle described above, the device for combining multiple images for photography of the present invention can be used solely to combine two separate images without the necessity of being associated with a titler. For example, when a screen is placed in each of the first and second windows and images to be combined are projected on the respective screens, a combined image can be projected through the camera window. In this case, if a mask is placed in front of each of the screens to properly shade the light from a part of the projected image, a combined image can be produced in which one of the images is superimposed over the shaded part of the other image.

Although the present invention has been described herein in connection with a rectangular parallelepiped housing, a cylindrical or other shaped housing can also be used in the present invention.

BRIEF DESCRIPTION OF THE INVENTION*

1, 2, 3 and 4: windows
5: beam splitter
6: support member
7, 8 and 9: beam characteristics modifying means.

Translator's Remarks

In Japanese terminology, the term "magic mirror" appearing in this translation, for example, on page 3, last line, means "a mirror which modifies images" and broadly covers various kinds of such mirror, for example, a half mirror as contemplated in a preferable example of the beam splitter.

I claim:

1. An image combining apparatus for use in photography in the form of a rectangular parallelepiped housing comprising:
    a first open frame lying in a first vertical plane, said first open frame being adapted to mount a camera;
    a second open frame lying in a second vertical plane parallel to and spaced from said first open frame, said second open frame being adapted to receive a titler mechanism;
    a third open frame lying in a third vertical plane perpendicular to said first and second planes and interconnecting said first and second open frames, said third open frame comprising two pairs of aligned upper and lower parallel guide rails, said first pair of guide rails being adapted to receive interchangeable image forming means, and said second pair of guide rails being adapted to receive a removable light source;
    a fourth closed frame lying in a fourth vertical plane parallel to and spaced from said third open frame and interconnecting said first and second open frames;
    fifth and sixth closed frames lying in spaced parallel horizontal planes and interconnecting the respective upper and lower edges of said first, second, third and fourth frames and thereby forming top and bottom walls, respectively, said bottom wall including a diagonally extending mirror guide rail; and
    a rectangular one-way mirror having a length exactly corresponding to the distance between the joinder of said first and fourth frames and said second and third frames, and having a height exactly corresponding to the distance between said top and bottom walls, said one-way mirror being mounted to extend diagonally between the joinder of said first and fourth frames and said second and third frames thereby dividing said housing into a pair of equally dimensioned wedge-shaped sections, wherein said one-way mirror reflective surface faces said first and third open frame members, said one-way mirror being removably mounted within said housing and being held in a predetermined exact position by said mirror guide rail;
    wherein in operation, images from both said titler and said interchangeable image forming means will be simultaneously projected into said camera bosy.

* * * * *